(No Model.) 3 Sheets—Sheet 1.

J. B. HAIGHT.
SOFA.

No. 341,140. Patented May 4, 1886.

Attest:
J. Wm Strehli
E. R. Hill

Inventor:
John B. Haight
per Wm. Hubbell Fisher,
Atty (No Model.) 3 Sheets—Sheet 2.

J. B. HAIGHT.
SOFA.

No. 341,140. Patented May 4, 1886.

Attest:
Wm. Strehli
E. R. Hill

Inventor
John B. Haight
per Wm. Hubbell Fisher,
Atty.

N. PETERS. Photo-Lithographer, Washington, D. C.

(No Model.) 3 Sheets—Sheet 3.

J. B. HAIGHT.
SOFA.

No. 341,140. Patented May 4, 1886.

Attest:
J. Wm. Strehli
E. R. Hill

Inventor:
John B Haight
per Wm. Hubbell Fisher,
Atty.

UNITED STATES PATENT OFFICE.

JOHN B. HAIGHT, OF CINCINNATI, OHIO.

SOFA.

SPECIFICATION forming part of Letters Patent No. 341,140, dated May 4, 1886.

Application filed October 23, 1882. Serial No. 74,992. (No model.)

*To all whom it may concern:*

Be it known that I, JOHN B. HAIGHT, of Cincinnati, in Hamilton county, and State of Ohio, have invented certain new and useful Improvements in Combination-Furniture, of which the following is a specification.

My invention relates to that class of furniture which is designed to be used for a variety of purposes, and is adapted to present an appropriate appearance and configuration for the purpose for which it is to be employed.

The object of my present invention is to provide an article of furniture which has the appearance of and may be used either as a sofa or easy-chair, and which may be readily converted into a couch or table, and it is especially adapted, as herein shown, to the use of a surgeon or physician, as it may be made to serve the purpose of an office sofa, and may readily and quickly be converted into an operating-table capable of being placed in the various positions requisite for the convenience and needs of the surgeon and physician.

Figure 1:
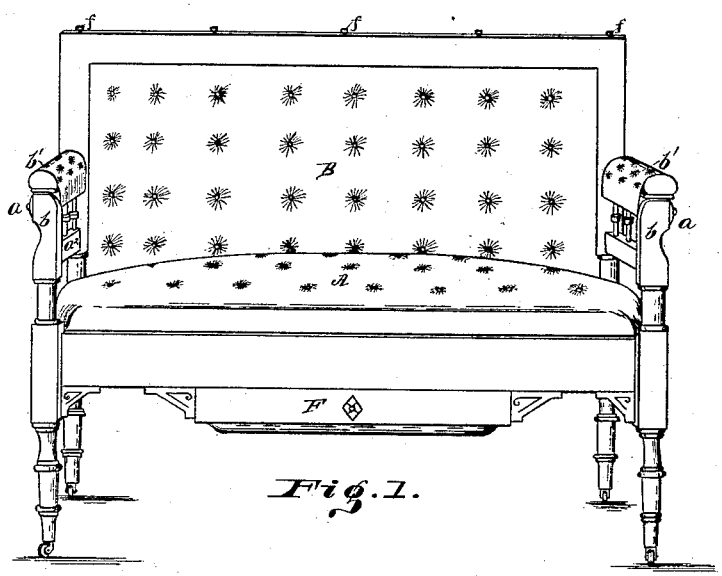
Figure 2:
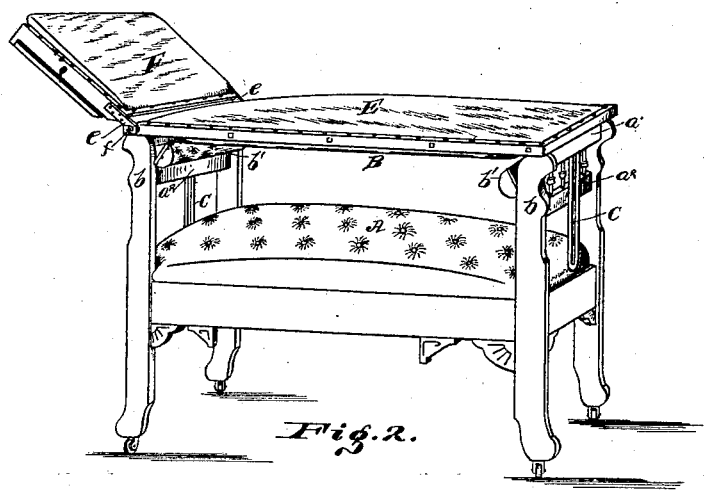
Figure 3:
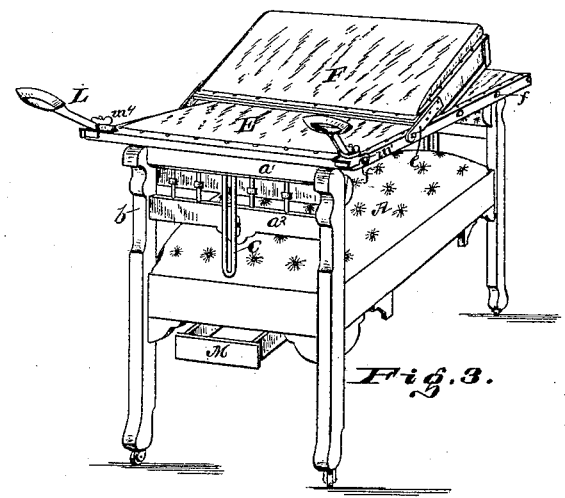
Figure 4:
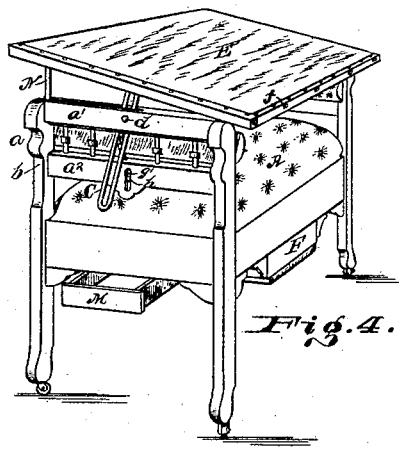
Figure 5:
Figure 12:
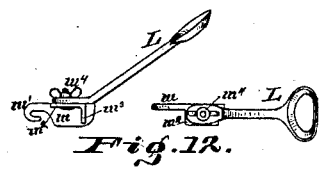
Figure 6:
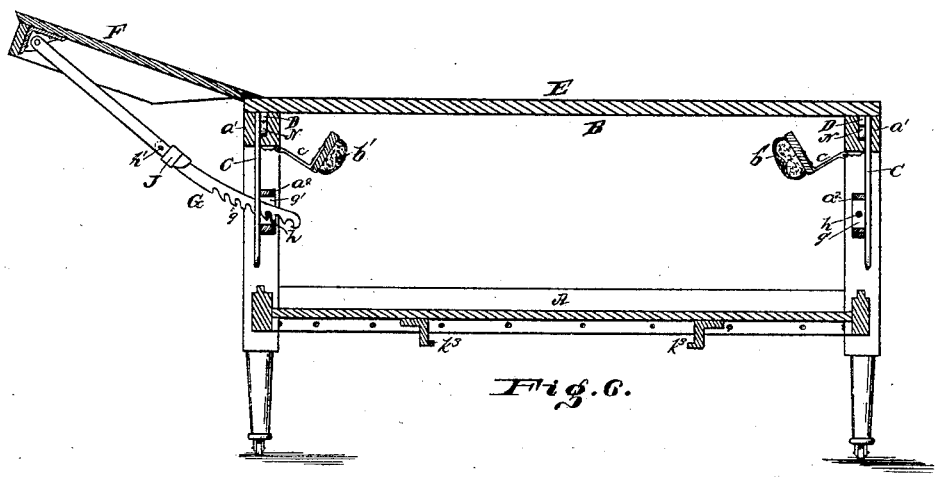
Figure 7:
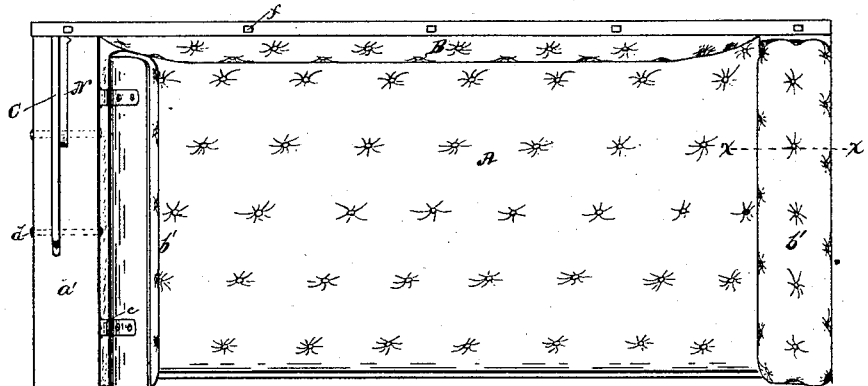
Figure 8:
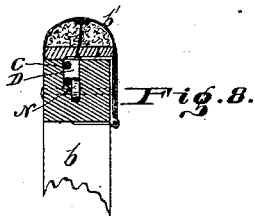
Figure 9:
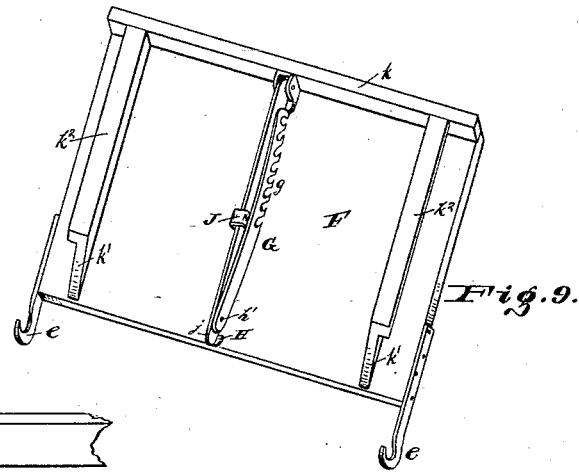
Figure 10:
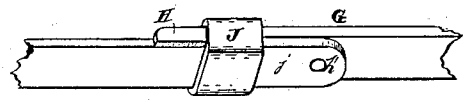
Figure 11:
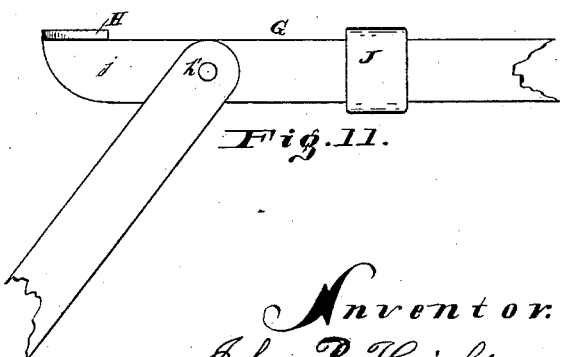

Referring to the drawings, forming part of this specification, Figure 1 represents my invention as a sofa. Fig. 2 represents the same as a long operating-table. Fig. 3 represents the table in one position, and Fig. 4 represents the table in another position, required for gynecological purposes. Fig. 5 represents a short operating-table. Fig. 6 is a central longitudinal section through the table shown in Fig. 2, the upholstering being omitted. Fig. 7 is a plan view of the sofa, showing the construction of the top of the arms. Fig. 8 represents a section through one of the arms, taken at the dotted line $x\ x$ of Fig. 7. Fig. 9 is a view of the lower side of the head and shoulder rest, showing the adjustment-ratchet folded as it is when the rest is not in use. Figs. 10 and 11 represent the joint in the ratchet for allowing it to be folded. Fig. 12 illustrates certain novel means for adjustably connecting the stirrup to the table.

A is the seat of the sofa, and B the back, upholstered as desired. At either end of the sofa is an arm, $a$, (see Fig. 1,) which consists of an upper rail, $a'$, (see Fig. 2,) and a lower rail, $a^2$, supported by corner-posts $b$, and to the rail $a'$ or other portion of the arm is hinged or otherwise secured the upholstered arm-cushion $b'$. When hinged, the hinges $c$ are preferably connected to the lower edge of the rail, so that the cushion $b'$ may be turned off from the top of the arm $a$. The upholstered arm-cushion $b'$ may be made without hinges and be connected to the arm $a$ by suitable guides or catches. In such event the arm-cushion $b'$ may at will be entirely removed. To the front side of the back B, and at either end, is connected a long staple, loop, or slotted bar, C, (see Figs. 2, 3, 4, and 6,) which, when the back is in the position shown in Figs. 1 and 7, for the purposes of adjustment, preferably rest in channels D in the top of the rails $a'$, as shown in Figs. 7 and 8. A pivot-bolt, rivet, or screw, $d$, is passed through the slotted bar C and through the rail $a'$ at the end of said slotted bar so that when the back B is in position for a sofa it is firmly held in said position as a sofa-back, and when the arm-cushions $b'$ are replaced on the arms these slotted bars are covered. At the point where the pivot $d$ passes through the rail $a'$ the channel D is extended vertically through the rail, making an opening through which the slotted bars C pass when the back rests upon the top of the arms, as shown in Fig. 6.

When it is desired to use the piece of furniture as an operating-table, the arm-cushions $b'$ are removed from the top of the arms, and the back B is then brought over onto the arms, the slotted bar C and pivot $d$ serving to guide it, and in connection with its weight to keep it in position on the arms. The rear face of the back B is, when the said back is to be employed for gynecological or surgical purposes, preferably upholstered with a covering suitable for such purposes. When the back is brought up on the arms, a firm and substantial table is formed.

I provide a head-rest, F, which is preferably upholstered, and may be readily attached to the table, as shown, the preferable mode of attaching it being by hooks $e$, connected to it at either side, which hooks are caused to engage with studs $f$ at either edge of the top E. This rest F may be set at different angles with reference to the table, and is retained at the proper angle by suitable means, preferably by a ratchet, G, (see Figs. 6, 9, 10, and 11,) which is hinged at one end to the under side of the rest F, the other end being provided with teeth $g$, and passing through an opening, $g'$, in the rail $a^2$, in which opening is a rod or bolt, $h$, with which the teeth of the ratchet engage. This ratchet G is formed in two sections, hinged together at $h'$. The end $j$ of one of the sections extends slightly beyond the pivot $h'$, and is provided with a stop-lug, H, which, when the two sections are placed in line, rests upon the edge of the other section, as shown in Fig. 10, forming a knuckle-joint, and a loop or sleeve, J, being slipped over the projecting ends $j$ until it strikes against the lug H. The ratchet is held rigid, as if composed of one piece.

When the rest F is not in use, it is preferably placed under the seat A, as shown in Fig. 1, being upheld to the seat by any suitable means. The rest is thus entirely out of the way, and appears as an ornament. For economy of room and additional service, this rest may be employed as a drawer, and when so employed is preferably constructed as follows: The under side of the rest F is provided with front and back flanges, $k$, and side flanges, $k'$, extending around four sides, as shown in Fig. 9, and forming, in connection with the main board of the head-rest, a drawer. The flanges at the ends of the rest are provided with runners $k^2$, which engage with flanges $k^3$, fixed under the seat A, enabling the rest, when not in use, to be slid under the seat. When the rest F is to be placed under the seat, the ratchet G is folded, as shown in Fig. 9, when it is completely out of the way.

When the piece of furniture is to be used as an office sofa or easy-chair, as before stated, it presents the appearance of such an article, and when all the features of my invention are embodied therein its convertibility into a table, &c, will be fully concealed. When it is to be used as an operating-table, the arm-cushions are removed from the arms and the table E brought up onto the arms, and the head and shoulder rest F attached to the table, as before described. When it is desirable to have a short operating-table, the ratchet G is folded and the rest is connected to the table in the position shown in Fig. 5, the studs $f$ being located at different points along the edges of the table for this purpose.

In Fig. 3 is shown the arrangement to adapt the table to the purposes of a gynecological chair, the stirrups or foot-rests L being attached to the table by any suitable means, preferably by means which are of my invention, and are as follows: $m$ indicates the hook-piece (see Figs. 3 and 12, Sheet 2) in general, having hook $m'$ and upper piece, $m^2$, and stop-piece $m^3$. The purpose of the latter piece is to prevent the hook from slipping off that stud in the edge of the table to which it is temporarily connected, and it will accomplish this object, not only when the hook-piece is adjusted at the corner of the table, but also when the hook-piece is adjusted, for the purposes of lithotomy, upon a stud at a desired distance from the table end. The hook-piece is connected to the lower end of the stirrup; and may be made in one piece with the stirrup, or the stirrup may be screwed thereto by a screw, $m^4$, as shown, or its suitable equivalent, in which event the distance between the stirrup may be altered at will for purposes of examination or operation, the purpose of these stirrups being to support the feet of the patient while undergoing either an examination or operation. A small drawer, M, may be placed under the end of the seat, in which instruments, &c., may be kept for the convenience of the examiner or operator.

In examining a female in what is known as "Simms'" position it is essential to have one side of the table elevated, as shown in Fig. 4, and for this purpose I provide supporting-bars N, one of which is located at each end of the table. One end of the bar is pivoted to the arm which is at its respective end of the table. This bar N is preferably concealed, except when the table is being used as in Fig. 4. A preferred mode of concealing this bar N consists in placing the latter in a groove in the arm, and in the present instance, for convenience, the bar is placed in the channel D of its respective arm. That end of each bar which is not pivoted is free to be raised, as shown. When not in use, and the channel D is used for the reception of both slotted bar C and bar N, this bar N is dropped down into the channel, and preferably lies beneath the slotted bar C, as best shown in Fig. 7.

As above described, it will be seen that my invention is applicable to all the purposes of a surgeon's and physician's table, and also for use as an office sofa or chair.

Certain features of my invention may be very advantageously employed for a variety of other purposes—such, for instance, as dining-tables, side tables, and the like—where economy of room is an object, as is the case on steamboats and railroad-cars, as when the meal is finished the tables may be converted into sofas and chairs. If desired, the piece may be made in the form of a large arm-chair, in which event the table will be small, and may be used as a side table or stand.

The various features of my invention are preferably employed together. One or more of them may, however, be employed, so far as applicable, by themselves or in connection with devices other than those herein set forth.

Having thus described my invention, what I claim as new, and desire to secure by Letters Patent, is—

1. In a chair or sofa, the combination of movable back E, slotted sliding bars C, rigidly connected thereto, stationary cross-pieces $a'$ of the arms $a$, the cross-pieces $a'$ each being provided with slot, each having a stationary pivot, $d$, and each bar C being in the vertical plane of the adjacent piece, $a'$, and horizontally-supported on said strips or arms $a$, substantially as and for the purposes specified.

2. The combination of the movable back E, slotted sliding bars C, rigidly connected thereto, stationary cross-pieces $a'$, each provided with slot and each having a stationary pivot, $d$, and each bar C being in the vertical plane of its adjacent piece, $a'$, and horizontally supported, and the supporting-frame, substantially as and for the purposes specified.

3. A chair or sofa having a seat and supporting-frame, and arms $a$, having top rails, $a'$, provided with channels D, in combination with back B, having slotted bars C, connected to the rails $a'$ by pivots $d$, and constructed as described, whereby they may lie in the channel D, substantially as and for the purposes specified.

4. The combination of the back E, provided with studs $f$, the head-rest F, having hooks $e$, attached to the front portions of its inner edge, and connected as described, whereby it is supported without any rear ratchet, pawl, or brace, substantially as and for the purposes specified.

5. The combination of supporting-frame and cross-rails $a'$, back B, slotted bars C, rigidly attached to said back, pivots $d$, and bar N, substantially as and for the purposes set forth.

JOHN B. HAIGHT.

Attest:
EDWARDS RITCHIE,
E. R. HILL.